(12) United States Patent
Stickles et al.

(10) Patent No.: US 8,342,550 B2
(45) Date of Patent: Jan. 1, 2013

(54) ADJUSTABLE STEP ARRANGEMENT FOR A VEHICLE

(75) Inventors: George C. Stickles, Brighton, CO (US); Rex W. Stevens, Longmont, CO (US)

(73) Assignee: Bestop, Inc., Broomfield, CO (US)

( * ) Notice: Subject to any disclaimer, the term of this patent is extended or adjusted under 35 U.S.C. 154(b) by 969 days.

(21) Appl. No.: 12/259,109

(22) Filed: Oct. 27, 2008

(65) Prior Publication Data

US 2010/0102528 A1 Apr. 29, 2010

(51) Int. Cl.
*B60R 3/02* (2006.01)
(52) U.S. Cl. .......................... 280/166; 280/163
(58) Field of Classification Search .................. 280/166, 280/163
See application file for complete search history.

(56) References Cited

U.S. PATENT DOCUMENTS

| | | | |
|---|---|---|---|
| 431,307 A * | 7/1890 | Wood | 182/88 |
| 1,148,356 A | 7/1915 | Chickering | |
| 1,193,357 A | 8/1916 | Buxton | |
| 2,118,557 A | 5/1938 | Hamilton | |
| 2,142,949 A | 1/1939 | Linker | |
| 2,458,618 A | 1/1949 | McDonald | |
| 2,568,093 A | 9/1951 | Smid et al. | |
| 2,956,638 A | 10/1960 | Bustin | |
| 2,971,600 A | 2/1961 | Schultz | |
| 3,517,942 A * | 6/1970 | Cuffe et al. | 280/166 |
| 3,751,068 A * | 8/1973 | Green | 280/166 |
| 3,817,554 A * | 6/1974 | Cuffe et al. | 280/166 |
| 4,180,143 A * | 12/1979 | Clugston | 182/91 |
| 4,185,849 A | 1/1980 | Jaeger | |
| 4,200,303 A * | 4/1980 | Kelly | 280/166 |
| 5,228,707 A * | 7/1993 | Yoder | 280/166 |
| 5,335,752 A * | 8/1994 | Kozlowski | 182/127 |
| 5,697,626 A * | 12/1997 | McDaniel et al. | 280/166 |
| 5,716,064 A | 2/1998 | Frerichs | |
| 5,732,996 A * | 3/1998 | Graffy et al. | 296/62 |
| 6,036,208 A | 3/2000 | Frerichs | |
| 6,168,176 B1 * | 1/2001 | Mueller | 280/163 |
| 6,435,534 B1 * | 8/2002 | Stone | 280/163 |
| 6,655,706 B1 | 12/2003 | Murrell | |
| 6,663,125 B1 * | 12/2003 | Cheng | 280/166 |
| 6,685,204 B1 * | 2/2004 | Hehr | 280/166 |
| 6,742,793 B2 | 6/2004 | Henriksen et al. | |
| 6,840,526 B2 * | 1/2005 | Anderson et al. | 280/166 |
| 6,926,295 B2 | 8/2005 | Berkebile et al. | |
| 6,955,370 B2 | 10/2005 | Fabiano et al. | |
| 7,976,042 B2 * | 7/2011 | Watson et al. | 280/166 |
| 8,002,298 B2 * | 8/2011 | Casbolt et al. | 280/166 |
| 2010/0102528 A1 * | 4/2010 | Stickles et al. | 280/163 |

\* cited by examiner

*Primary Examiner* — Jeffrey J Restifo
(74) *Attorney, Agent, or Firm* — W. Scott Carson

(57) ABSTRACT

An adjustable step arrangement for a vehicle to assist a user to get into and out of the vehicle. The arrangement includes a U-shaped, tube member supported on a guide system. The tube member has two leg portions with a step section extending between them. The leg portions of the tube members have slots in their undersides that slidably receive vertical guide plates attached to the vehicle. The plates have guide channels in them and the leg portions of the tube member are secured to the guide plates by bolts passing through the channels wherein the adjustable step arrangement can be selectively moved either manually or by a powered assembly between its raised and lowered positions. The step arrangement is accessible to the user for assistance getting into and out of the vehicle in both its raised and lowered positions.

29 Claims, 14 Drawing Sheets

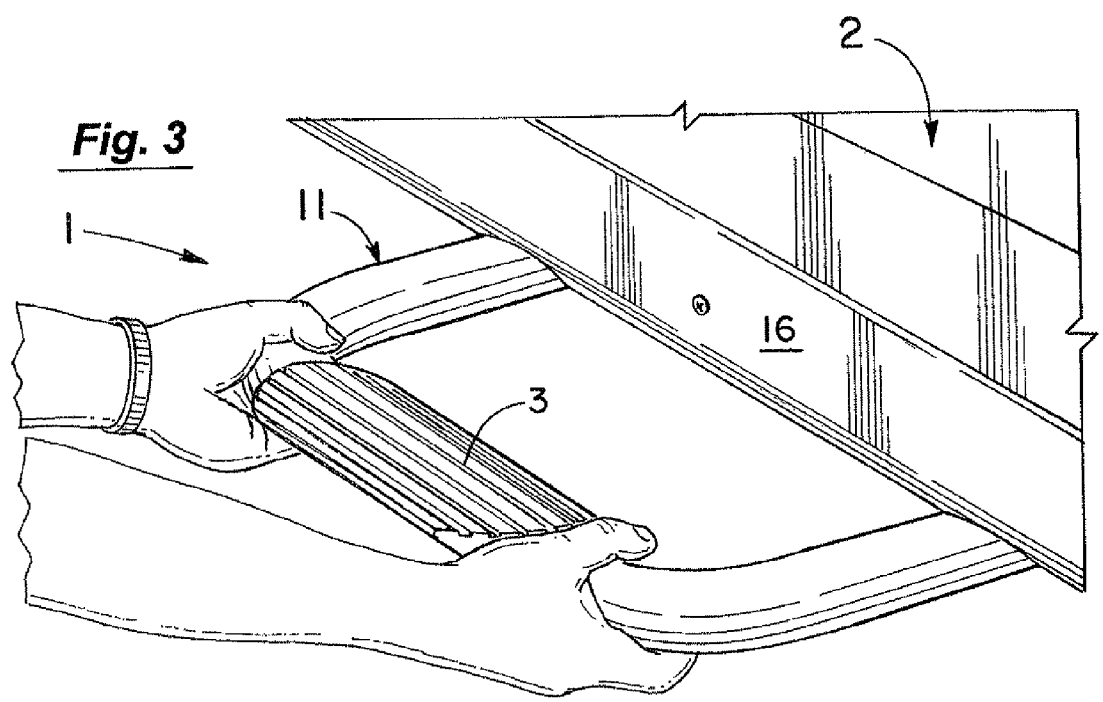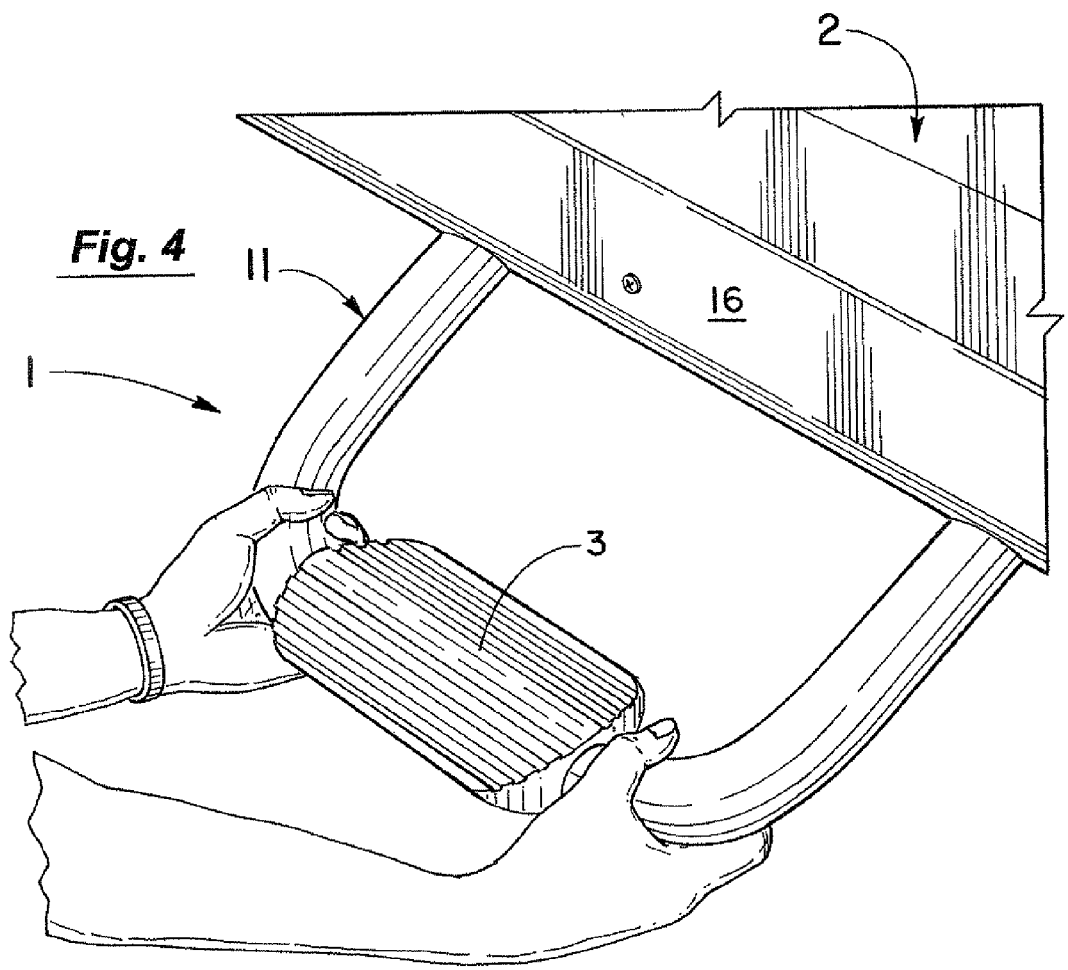

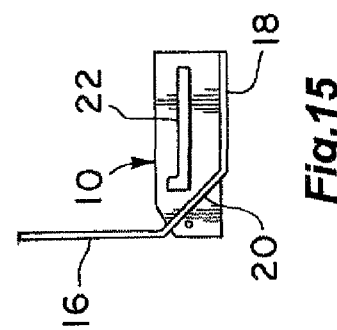
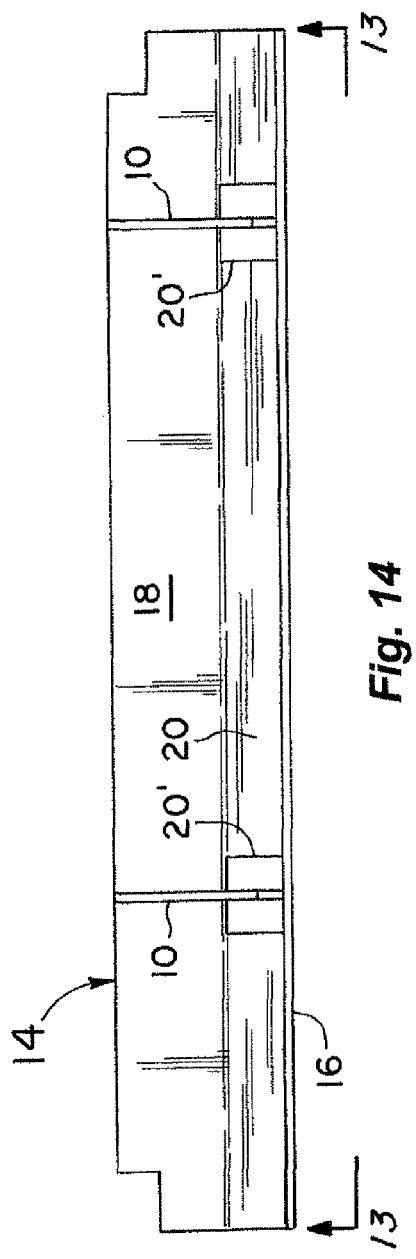
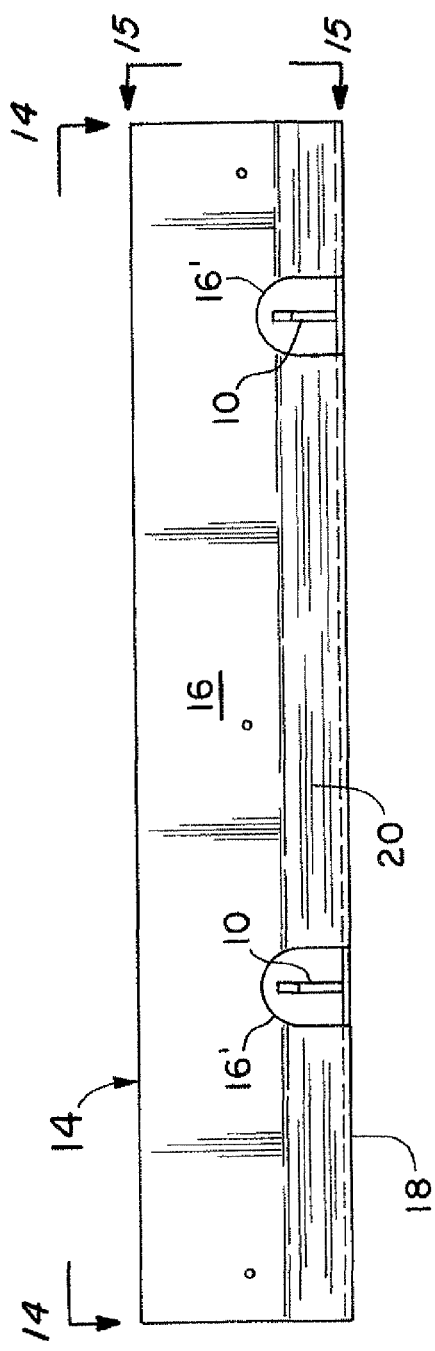

ADJUSTABLE STEP ARRANGEMENT FOR A VEHICLE

BACKGROUND OF THE INVENTION

1. Field of the Invention

This invention relates to the field of steps for vehicles and more particularly to the field of adjustable step arrangements for sport utility and similar vehicles.

2. Discussion of the Background

Sport utility vehicles commonly have nerf bars on each side of the vehicle. The nerf bars are typically U-shaped, tubular members that are fixed to the vehicle. The bars can be used as steps but are normally attached to the vehicle primarily to deflect away movable road obstacles (e.g., rocks or bushes) from the sides of the vehicle. In this manner, damage to the vehicle sides, particularly the doors, can be avoided or at least minimized. For stationary road objects that are fixed or essentially immovable, the rigid nerf bars tend to deflect or move the vehicle itself away from them to avoid damage to the vehicle.

Typically, such nerf bars are attached to the vehicle roughly at its floor level or slightly lower. For many vehicles, the bars are then really not much of an aide to getting into and out of the vehicle and in many cases, the person just steps over them. In situations in which the vehicle has high ground clearance or oversized tires, the fixed bar is often just too high to effectively aid the person as a step. That is, rather than being positioned roughly halfway between the ground and the floor level of the vehicle, the nerf bar is essentially at or very close to the floor level and simply too high to be of much help as a step. Such fixed nerf bars then end up really only performing the function of deflecting and protecting the vehicle from road obstacles.

It is noted that fixed running boards are commonly sold as a step but like the fixed nerf bars discussed above, running boards are often so close to the height of the vehicle floor that most people just step over them getting into or out of the vehicle. Running boards also do not typically stick out far enough from the vehicle sides to serve as protection to deflect obstacles away from the vehicle sides. Such running boards in this regard are commonly within the profile of the side flares or fenders that cover the tires.

Adjustable step arrangements are known to overcome some of these drawbacks of fixed nerf bars and running boards. However, most are very complicated and not easily manipulated between the various step heights. Some are spring biased in which the person steps on them to lower the step under his or her own weight after which the spring draws the step up to an out-of-the way, retracted position. Although such steps move between lowered and retracted or even raised positions, they are only usable as a step in the lowered position and really do not offer the person more than one height choice.

With these and other problems in mind, the present invention was developed. In it, adjustable step arrangements are provided that offer the person choices of different heights for the step and easy and quick ways to make the adjustments.

SUMMARY OF THE INVENTION

This invention involves an adjustable step arrangement for a vehicle to assist a user to get into and out of the vehicle. The arrangement includes a U-shaped, tube member supported on a guide system. The tube member has two leg portions with a step section extending between them. The leg portions of the tube members have slots in their undersides that slidably receive vertical guide plates attached to the vehicle. The plates have guide channels in them and the leg portions of the tube member are secured to the guide plates by bolts passing through the channels.

The adjustable step arrangement can be selectively moved between its raised and lowered positions. In its raised position, the step arrangement is essentially at the level of a typical nerf bar. However, in its lowered position, the step section of the arrangement is substantially halfway between the ground and the floor level of the vehicle and offers a more accessible step for the user. To lower the step arrangement from its raised position, the tube member including its step section can be manually pulled outwardly of the vehicle where it will drop under its own weight to the lowered position. To raise the step arrangement, the process can simply be reversed.

A powered version of the present invention is also disclosed that uses a piston-cylinder assembly to move the adjustable step between its raised and lowered positions.

BRIEF DESCRIPTION OF THE DRAWINGS

FIGS. 1-5 sequentially illustrate the adjustable step arrangement of the present invention being manually moved from its raised position of FIG. 1 to its lowered position of FIG. 5.

FIGS. 13-15 illustrate the angled plate piece of the support or guide system that slidably receives the tube member of the step arrangement.

DETAILED DESCRIPTION OF THE INVENTION

Figure 1:
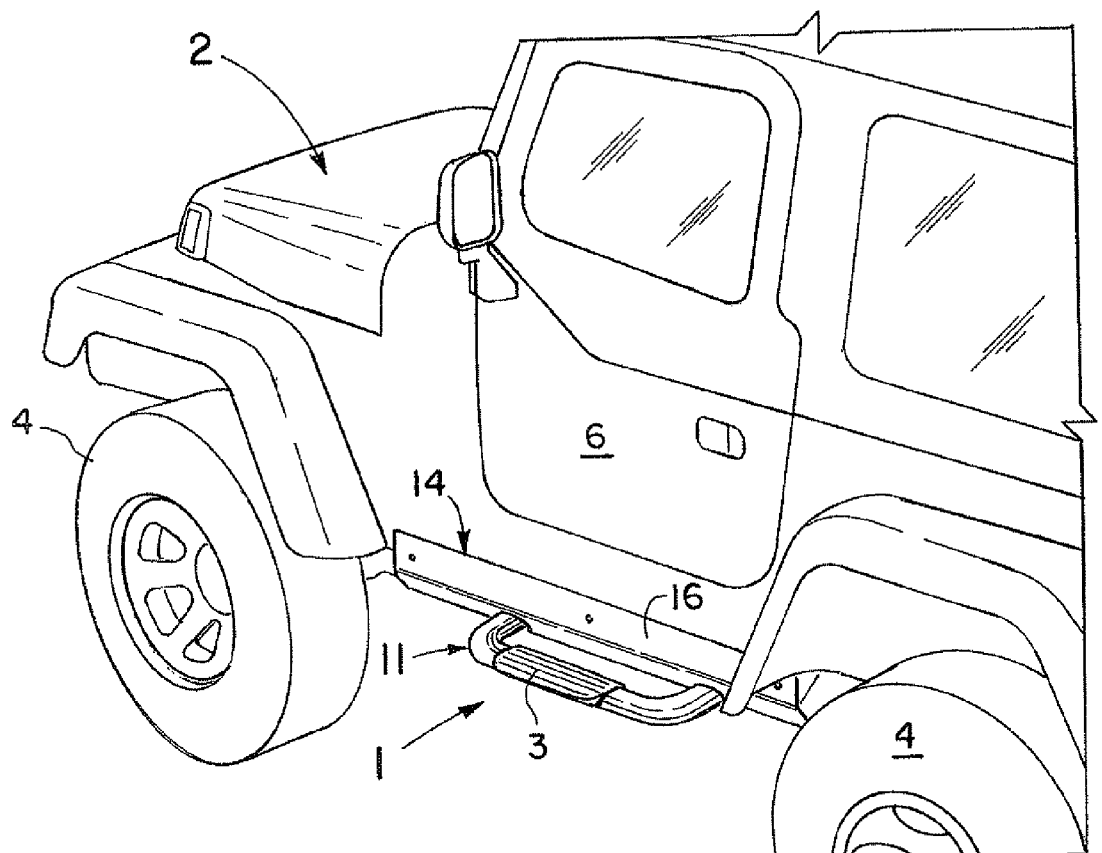
Figure 2:
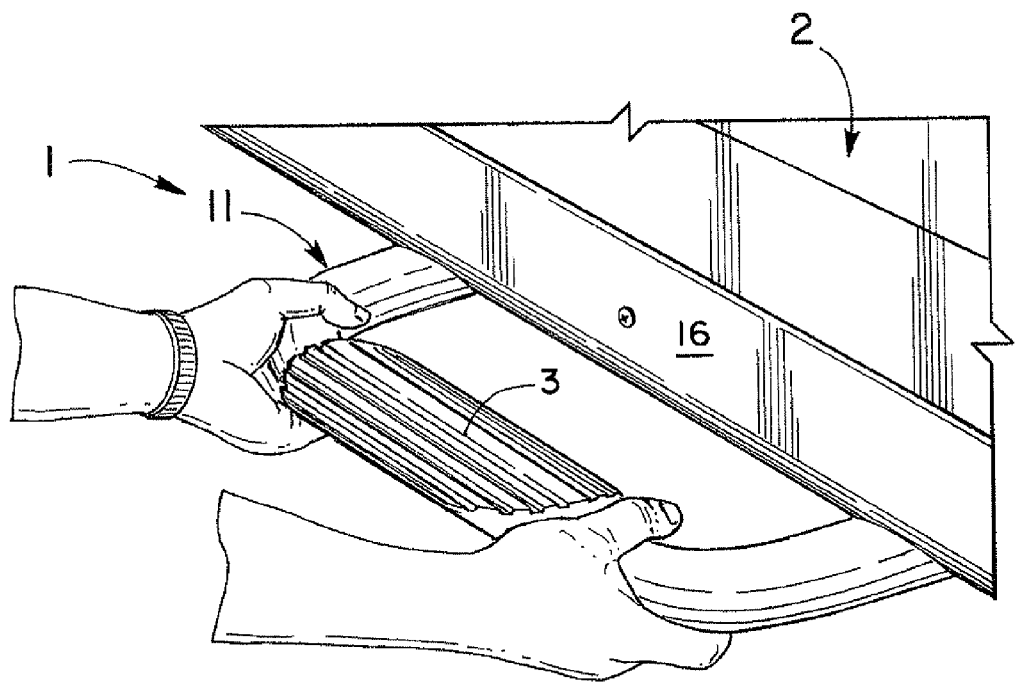
Figure 5:
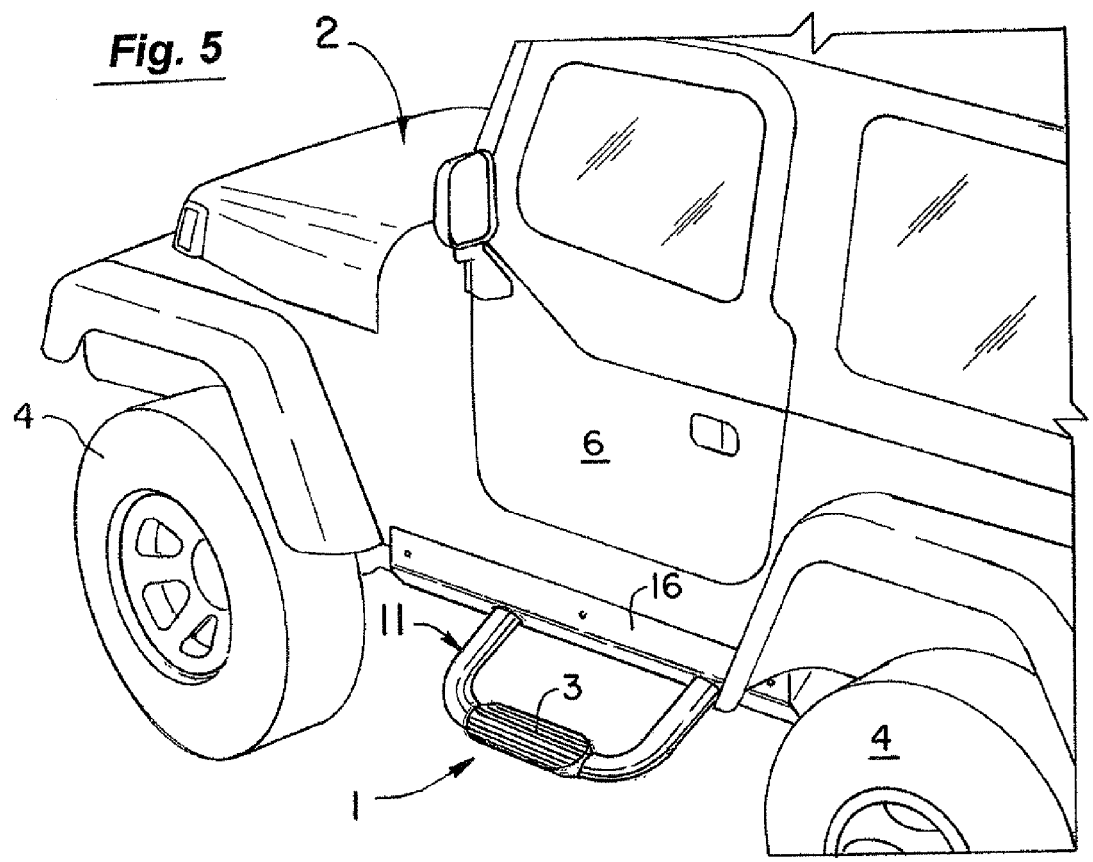
Figure 6:
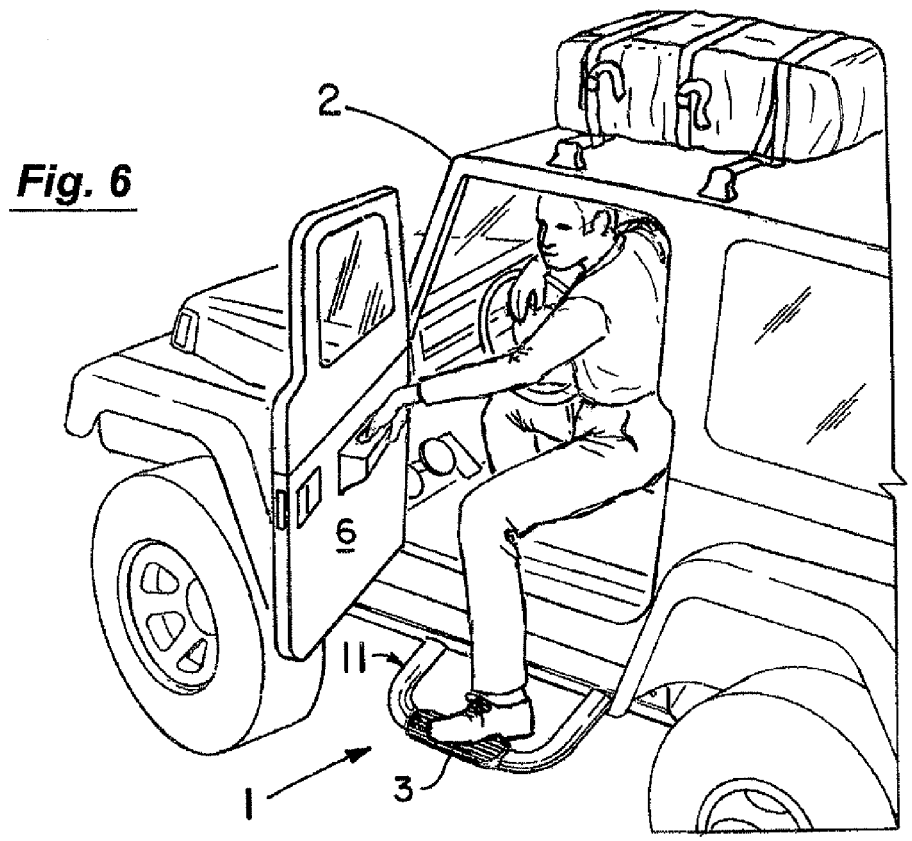
FIG. 6 shows the adjustable step arrangement in its lowered position to assist a user to get into and out of the vehicle.
Figure 7:
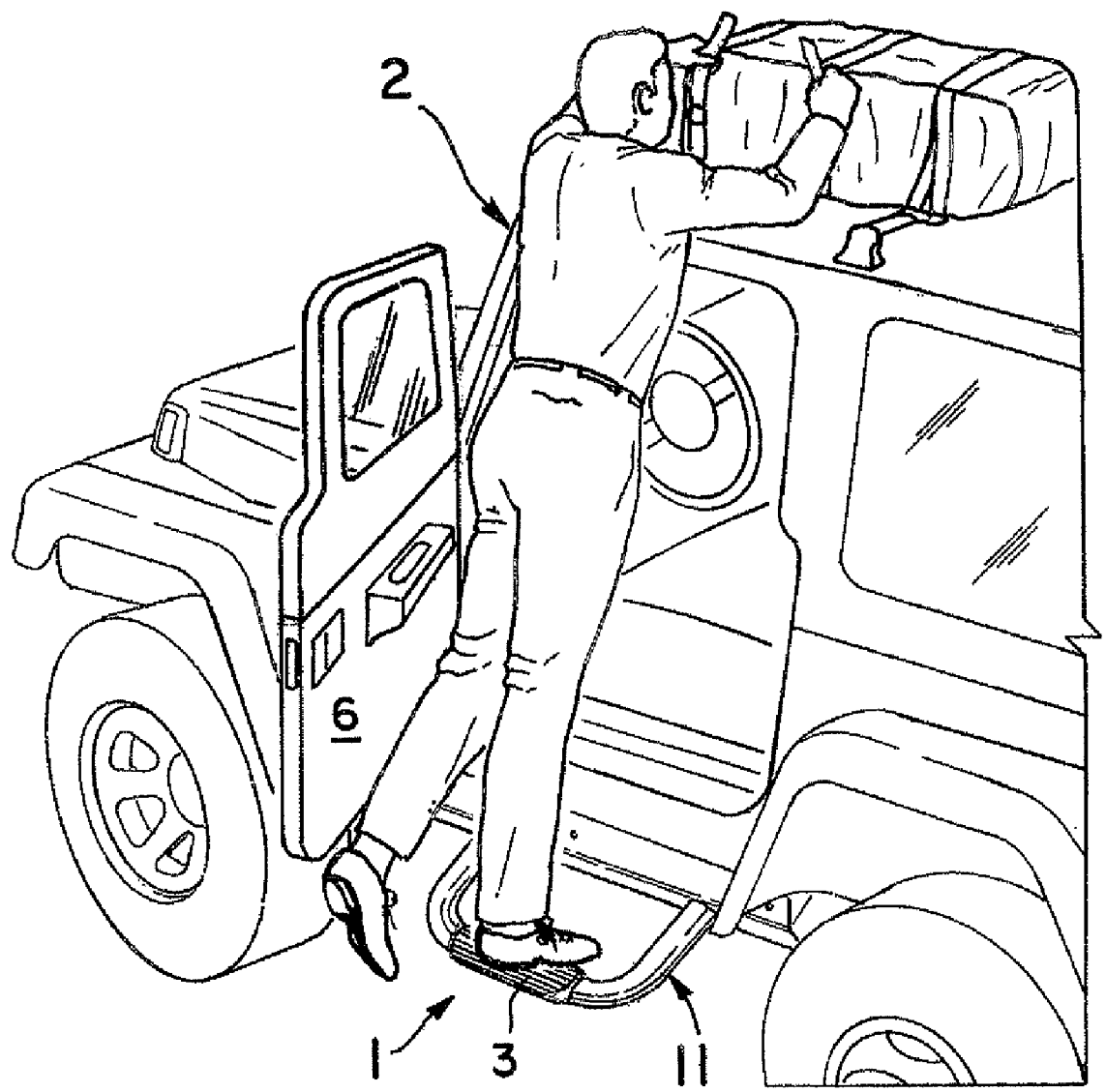
FIG. 7 illustrates the lowered step arrangement being used to reach stored items on the top of the vehicle.

FIGS. 1-5 show the adjustable step arrangement 1 of the present invention being manually moved from its raised position of FIG. 1 to its lowered position of FIG. 5. In doing so, the step section 3 of the arrangement 1 can be manually pulled outwardly of the vehicle 2 (FIGS. 2-3) wherein it will drop (FIG. 4) to its lowered position of FIG. 5. In its raised position of FIG. 1, the adjustable step arrangement 1 of the present invention is essentially at the level of a typical nerf bar. However, in its lowered position of FIG. 5, the adjustable step arrangement 1 offers a more accessible step section 3 for certain users in certain situations and for certain vehicles. That is, the raised position of FIG. 1 at the level of a typical nerf bar may actually be too high to be of much aid as a step to a shorter user or a user whose vehicle 2 has a high clearance or oversized tires 4 that significantly raise the height of the entry to the door 6. The adjustable step arrangement 1 of the present invention can then assist such users in such situations to get into and out of the vehicle 2 (FIG. 6) or to more easily reach the vehicle top and stored items on the top of the vehicle 2 (FIG. 7).

Figure 8:
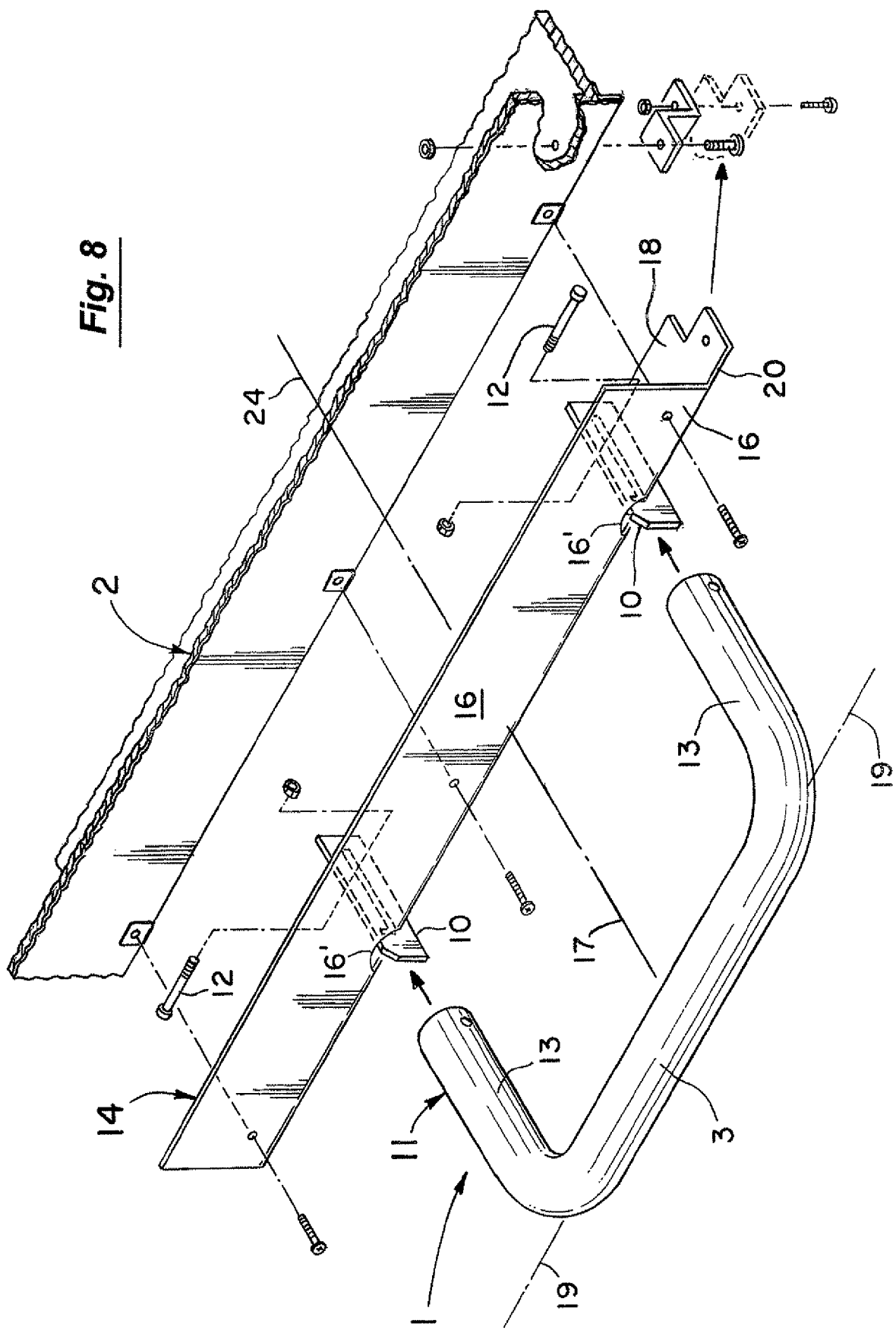
FIG. 8 is a simplified, exploded view of the step arrangement.
Figure 9:
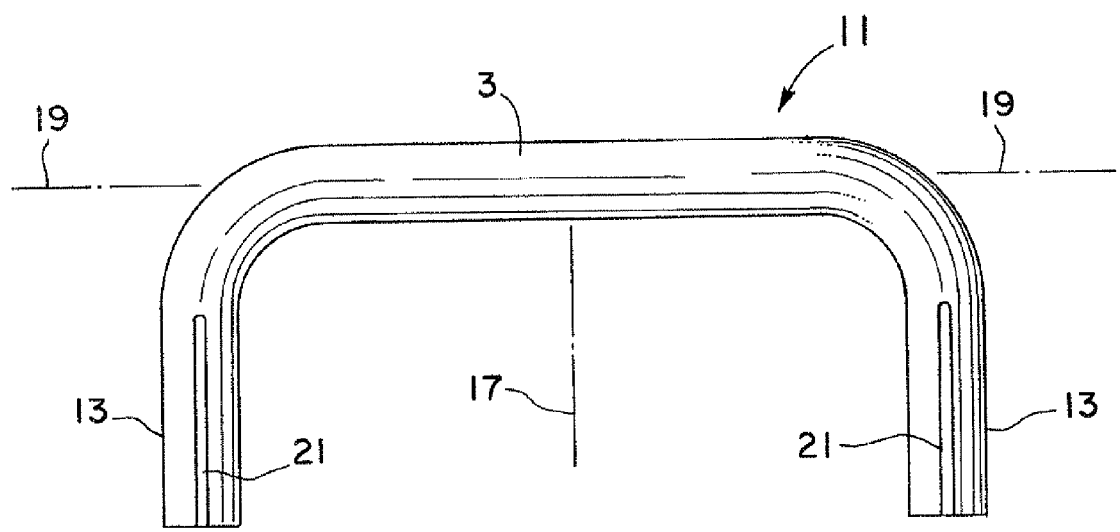
FIG. 9 is an underneath view of the U-shaped tube member of the step arrangement illustrating the slots in its leg portions.
Figure 10:
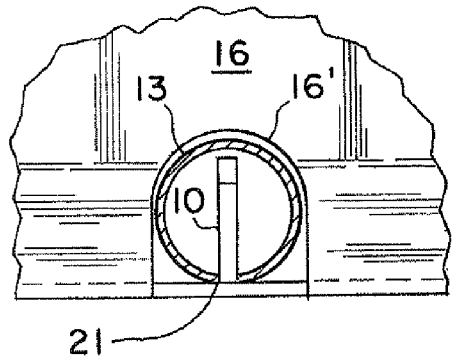
FIG. 10 illustrates how the tube member receives the vertical guide plates of the support system in the slots of its leg portions.
Figure 11:
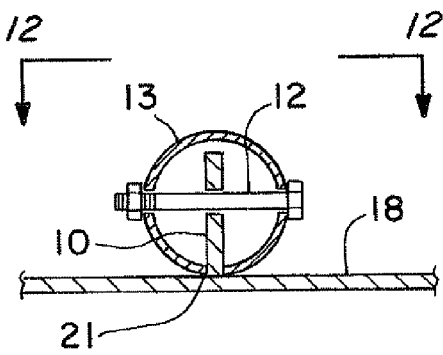
FIG. 11 is a view similar to FIG. 10 and taken along line 11-11 of FIG. 12 showing how each leg portion of the tube member is attached to the guide plate by a securing bolt.
Figure 12:
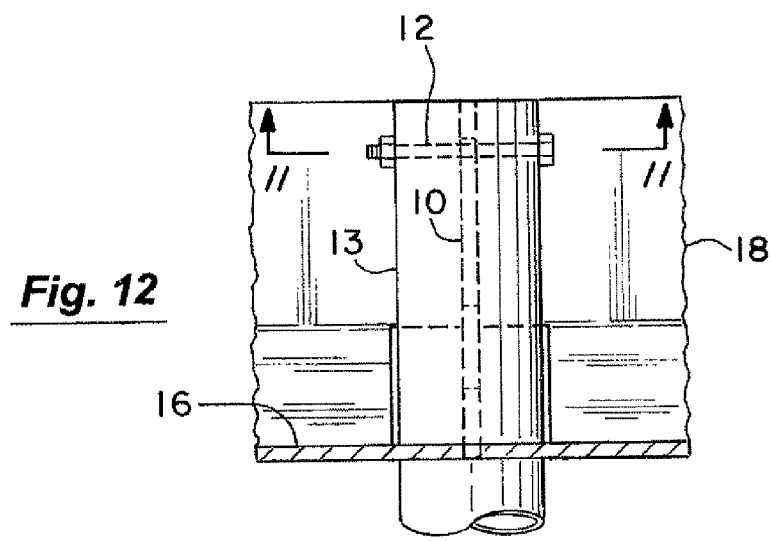
FIG. 12 is a plan view taken along line 12-12 of FIG. 11.

The adjustable step arrangement 1 of the present invention as shown in the simplified, exploded view of FIG. 8 includes a substantially U-shaped, hollow tube member 11. The tube member 11 has substantially parallel leg portions 13 with the step section 3 extending therebetween. The leg portions 13 are spaced from each other and extend along the central axis 17. The step section 3 in turn extends along the perpendicular axis 19 between the leg portions 13. The hollow leg portions 13 have respective slots 21 on their undersides (see FIG. 9) that extend substantially parallel to each other along the axis 17. In assembling the adjustable step arrangement 1 as discussed in more detail below, the leg portions 13 of the tube member 11 of FIG. 8 are moved to receive the guide plates 10 in the slots 21 (FIG. 10). The tube member 11 is then slidably secured to the respective guide plates 10 by the elongated members or bolts 12 (FIGS. 11-12).

More specifically, the guide plates 10 of FIG. 8 are part of a guide or support system for the tube member 11. The guide system includes the angled piece 14 of FIG. 8 which is attached or mounted to the vehicle 2 (see also FIG. 1) below the door 6. The angled piece 14 has a substantially vertical face or plate member 16 (FIGS. 8 and 13) and a substantially horizontal face or plate member 18 (FIGS. 8 and 14). The plates 16 and 18 as best seen in FIGS. 8, 13, and 15 are connected by a section 20 that is inclined at about 45 degrees. The plate 16 and section 20 have respective cutouts 16' and 20' (FIGS. 13 and 14) adjacent the protruding front of each guide plate 10 (see also FIG. 15). Each guide plate 10 has a guide channel 22 (FIG. 15) through which the bolt 12 of FIGS. 11-12 is passed to secure the respective leg portions 13 of the tube member 11 to the guide plates 10 (see also FIGS. 16-18).

The vertical guide plates or members 10 are spaced from each other substantially the same distance as the slots 21 in the leg portions 13 of the tube member 11. As illustrated in FIG. 8, the guide plates 10 extend substantially parallel to each other along the substantially horizontal axis 24. The guide plates 10 and axis 24 are preferably fixed relative to the vehicle 2 wherein the guide plates 10 are slidably received in the respective slots 21 of the leg portions 13 as discussed above and extend within the hollow leg portions 13 (FIGS. 10-12).

Figure 17:
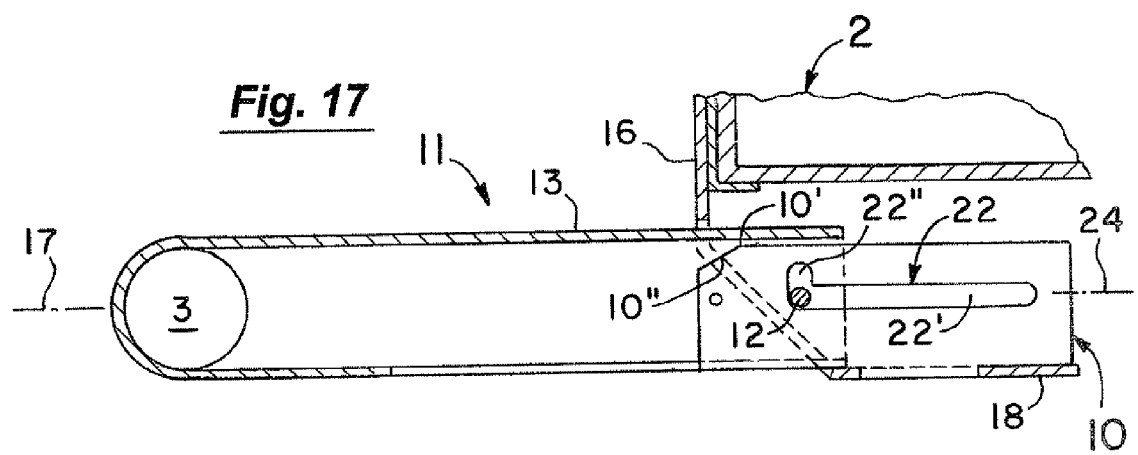
Figure 18:
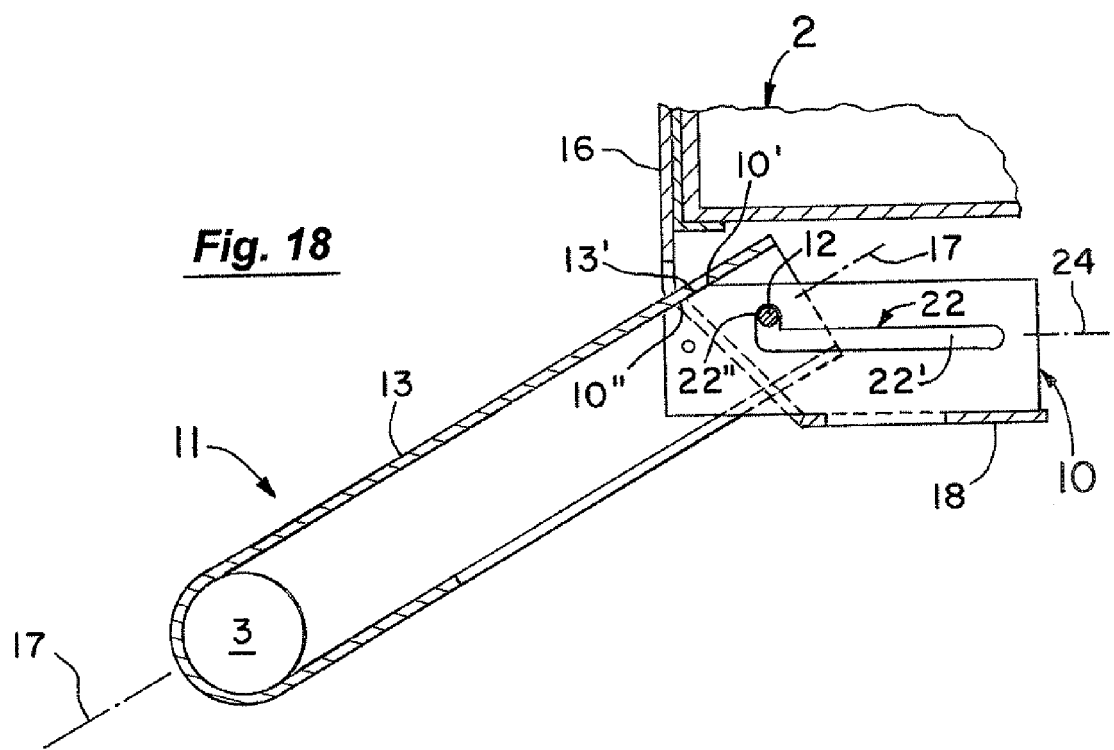

In operation, the tube member 11 as in FIG. 1-4 can be manually pulled outwardly of the vehicle 2. In doing so, the bolts 12 of each leg portion 13 (FIGS. 16-18) will be moved along the guide 10 channel 22. In the raised position of the adjustable step arrangement of FIGS. 1 and 16, the tube member 11 extends substantially horizontally and the bolt 12 is essentially at the rear of the guide channel 22. As the tube member 11 is pulled is farther out horizontally (FIGS. 3 and 17), the bolt 12 is moved to the front of the substantially horizontal section 22' of the guide channel 22. At this point, the weight (e.g., 15 pounds) of the tube member 11 will cause the front of the tube member 11 to drop or substantially pivot about the upper edge 10' of the guide plate 10 (FIG. 18). This will then lower the step section 3 to the position of FIG. 5. The upper edge 10' in this regard is substantially horizontal and extends substantially perpendicular to the axis 17.

Figure 16:
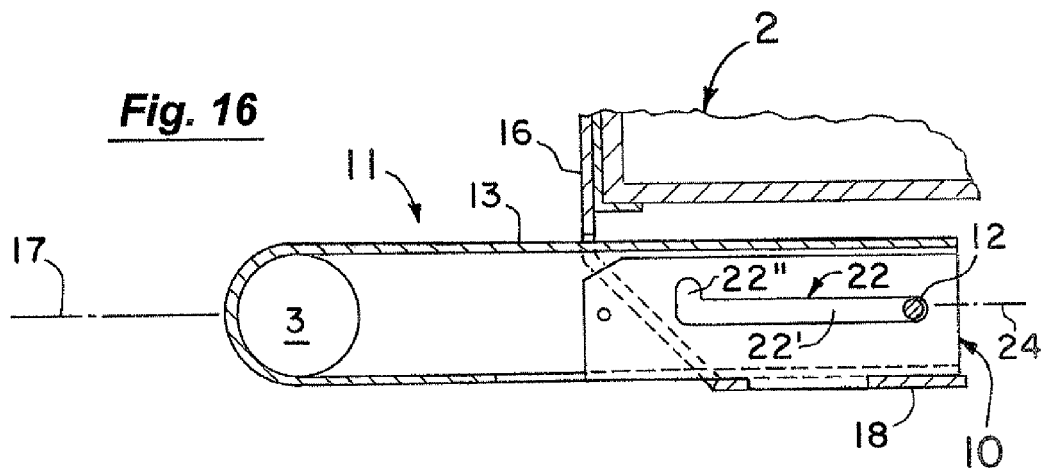
FIGS. 16-18 sequentially show how the tube member forming the step of the arrangement can be manually moved between its raised and lowered positions on the support or guide system.

In the raised position of FIG. 16, the tube member 11 is secured in a substantially horizontal position by the binding forces of the bolt 12 in the channel section 22 and the leg portion 13 supported on the substantially horizontal plate 18. The tube member 11 remains substantially horizontal by this binding arrangement until the bolt 12 reaches the front of the main or horizontal section 22' of the guide channel 22 (FIG. 17). The tube member 11 as discussed above then drops under its own weight as in FIG. 18 with the bolt 12 moving upwardly into the notch or substantially vertical section 22'' of the guide channel 22. The tube member 11 in this position of FIG. 18 is then maintained in the lowered position by its weight and the bolt 12 as received in the notch or vertical section 22'' of the guide channel 22. The inside 13' of the leg portion 13 in FIG. 18 abutting the inclined (e.g., 30 degrees) surface 10'' of the guide plate 10 also aids in maintaining the tube member 11 in its lowered position. To move the tube member to its raised position, the steps of FIGS. 16-18 can then be manually reversed.

In the raised position of FIGS. 1 and 16, the axes 17 and 24 of FIG. 8 are preferably aligned substantially horizontally with the step section 3 of the tube member 11 preferably spaced from the vehicle 2 below the door 6 as in FIG. 1. As discussed above, the tube member 11 is then moved outwardly of the vehicle 2 along the aligned axes 17, 24 (FIG. 17) until the tube member 11 drops as in FIG. 18. The axis 17 of the tube member 11 is then inclined (e.g., 30 degrees) to the horizontal axis 24 and the step section 3 is spaced lower and farther from the vehicle 2 (FIG. 5) than in the raised position of FIG. 1. In both the raised and lowered positions as illustrated, the step section 3 is accessible to the user for assistance getting into and out of the vehicle. 2.

Figure 19:
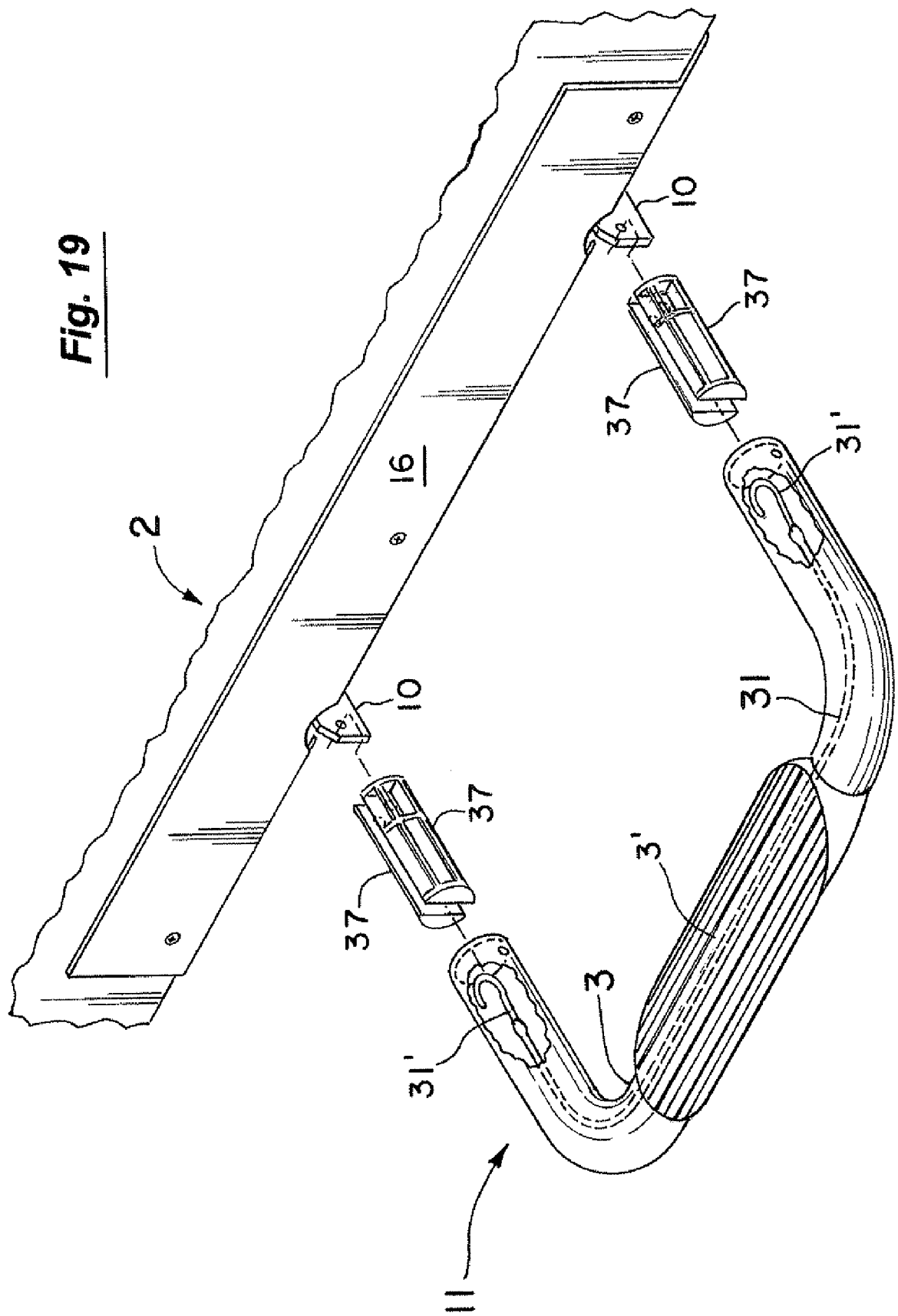
FIG. 19 is an exploded view of another embodiment of the invention with the tube member including a biasing, elastic or BUNGEE cord, angled step piece, and glide members.
Figure 20:
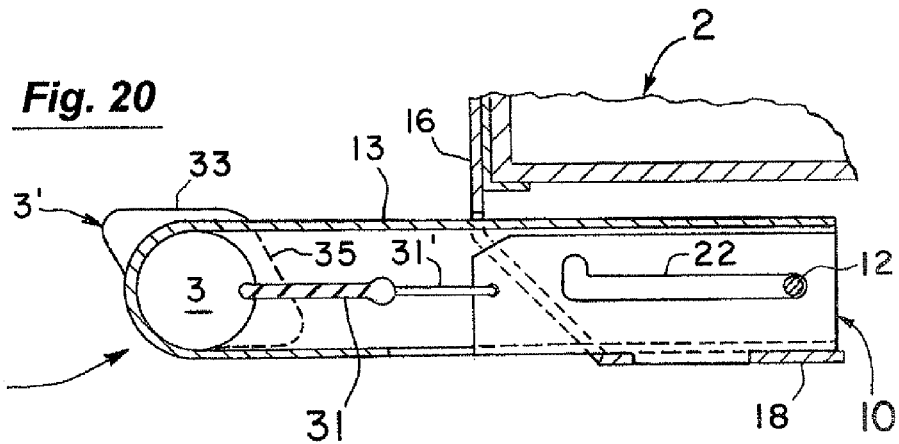
FIGS. 20-22 sequentially show how the embodiment of FIG. 19 can be manually moved between its raised and lowered positions.
Figure 21:
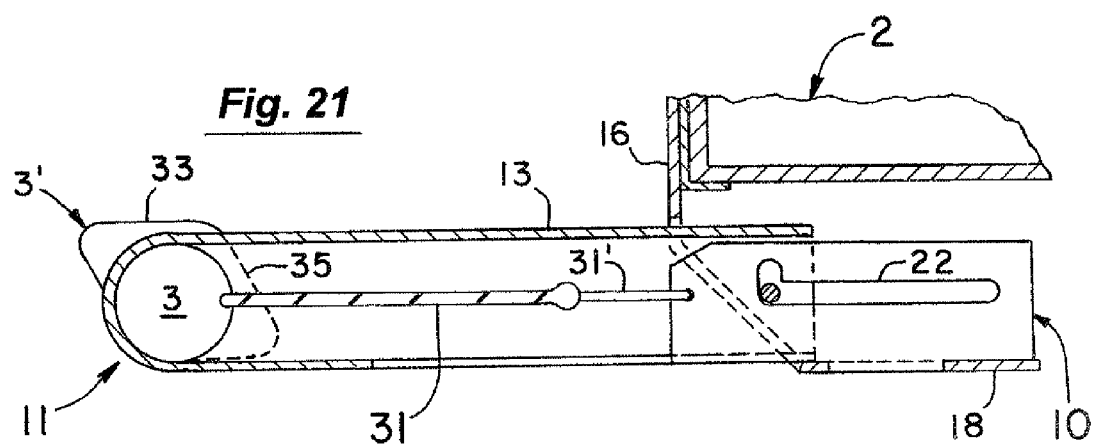
Figure 22:
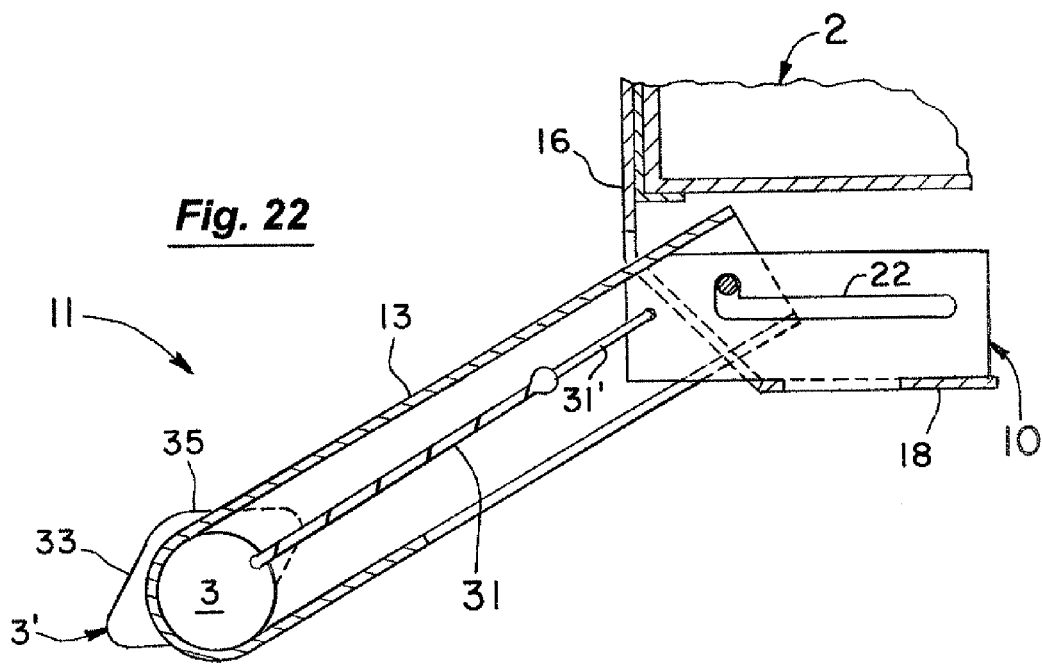

In the preferred embodiment, the tube member 11 is provided with a linear spring member 31 (e.g., elastic or BUNGEE cord) as in FIGS. 19-22 as well as an angled step piece 3' on the step section 3. The elastic cord 31 as illustrated in FIG. 19 is run within the hollow tube member 11 and the cord ends have hooks 31' for attachment to each guide plate 10 in FIGS. 20-22. The elastic cord 31 helps to hold or bias the tube member 11 in its respective raised and lowered positions of FIGS. 20 and 22 in addition to the binding forces discussed in reference to the embodiment of FIGS. 16-18. The elastic cord 31 is essentially a padded, elastic or resilient spring member and binds or abuts against the inside of the hollow tube member 11 at the step section 3. In this manner, the elastic cord 31 biases the tube member 11 without causing any abrasive rubbing or damage to the metallic tube member 11 as would a metallic or similar spring. The elastic cord 31 also will not rust and is essentially noiseless in operation. The angled step piece 3' as best seen in FIGS. 20-22 has surfaces 33 and 35 at an acute angle (e.g., 30 degrees) to each other. The surfaces 33 and 35 then provide a substantially horizontal step surface for the user in both the raised (33 in FIG. 20) and lowered (35 in FIG. 22) positions.

Figure 23:
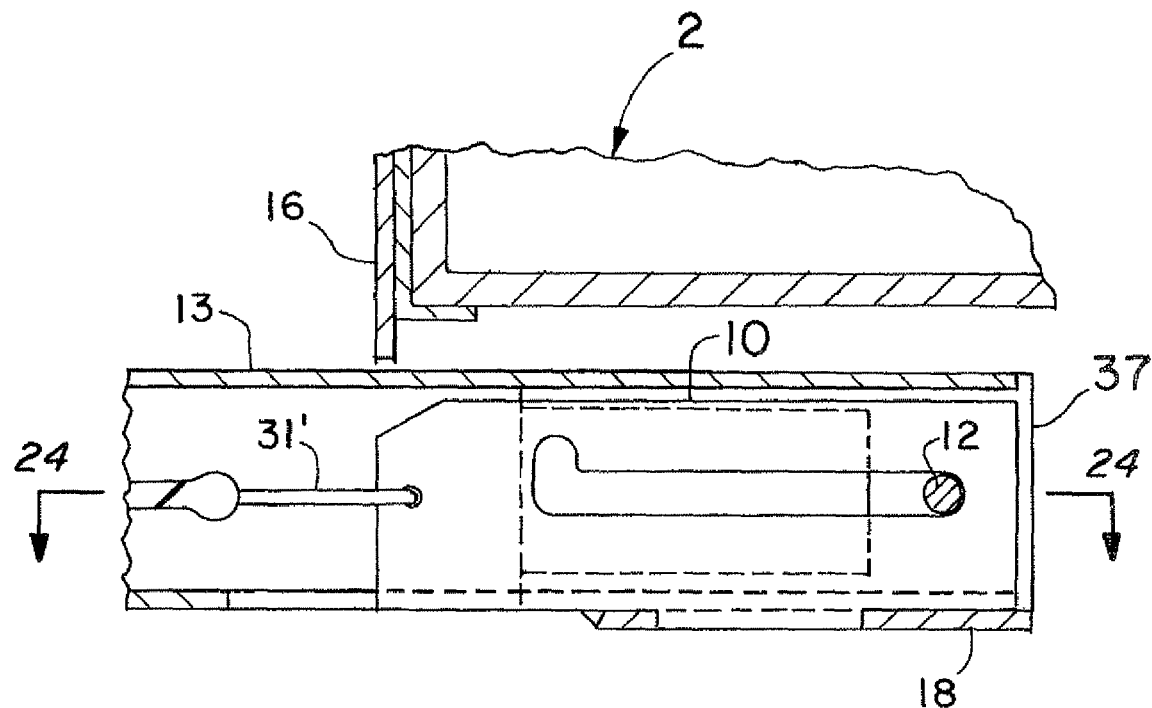
FIGS. 23-24 illustrate the glide members that help maintain the desired alignment of the tube member on its support system.
Figure 24:
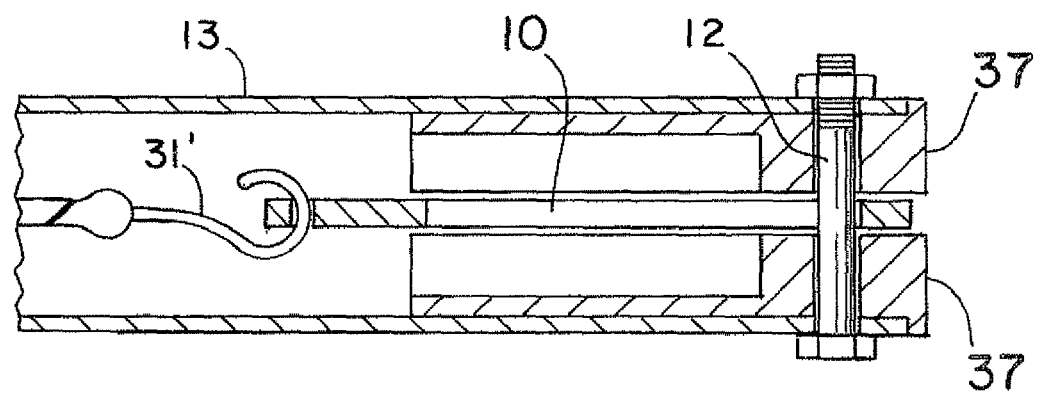

The preferred embodiment may additionally have glides 37 as illustrated in FIGS. 19 and 23-24. The glides 37 are preferably made of plastic and can be inserted into the open rear ends of the leg portions 13 of the tube member 11. In use, the glides 37 are positioned on the sides of each plate 10 (FIG.

24) to help maintain the desired alignment of the tube member 11 as it is slid relative to the guide plates 10 in the manner of FIGS. 20-22.

The spring-biased arrangement of FIGS. 19-22 is preferred not only because it adds binding forces as discussed above in the raised and lowered positions of FIGS. 20 and 22 but also because it can operate by itself to retract the tube member 11 in certain situations. That is, should a rock or other obstacle be struck and lift the lowered tube member 11 of FIG. 22 to the horizontal position of FIG. 21, the tension or force of the resilient cord 31 will draw the tube member 11 to the position of FIG. 20 by itself. In some cases, this will help to avoid damage to the step arrangement and to the vehicle. The resilient cord 31 will also serve as indicated above to keep the tube member 11 in the position of FIG. 20 even as vibrations and centrifugal forces may tend to try to move the tube member 11 outwardly of the vehicle 2. In the spring-biased arrangement as in the other arrangements of the present invention, the step section 3 is accessible and serves to assist the user to get into and out of the vehicle in both its raised and lowered positions.

Figure 25:
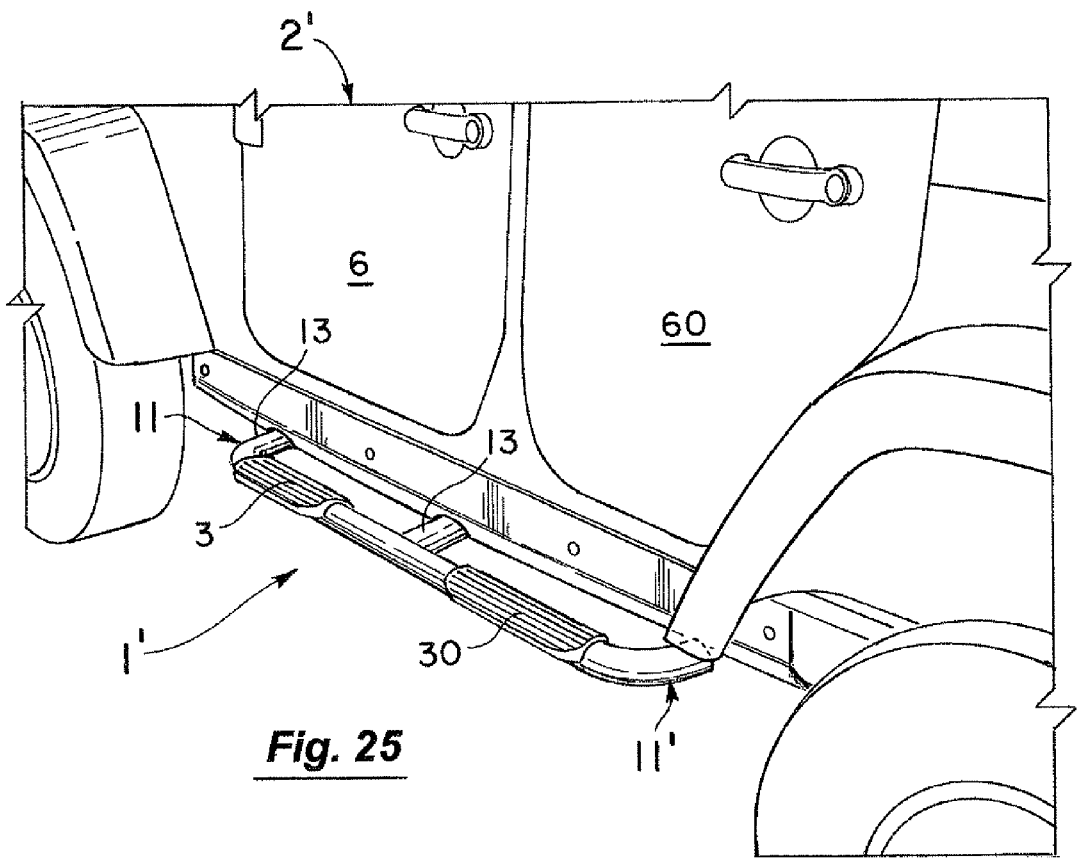
FIGS. 25-26 show the adjustable step arrangement of the present invention as adapted for a four door vehicle.
Figure 26:
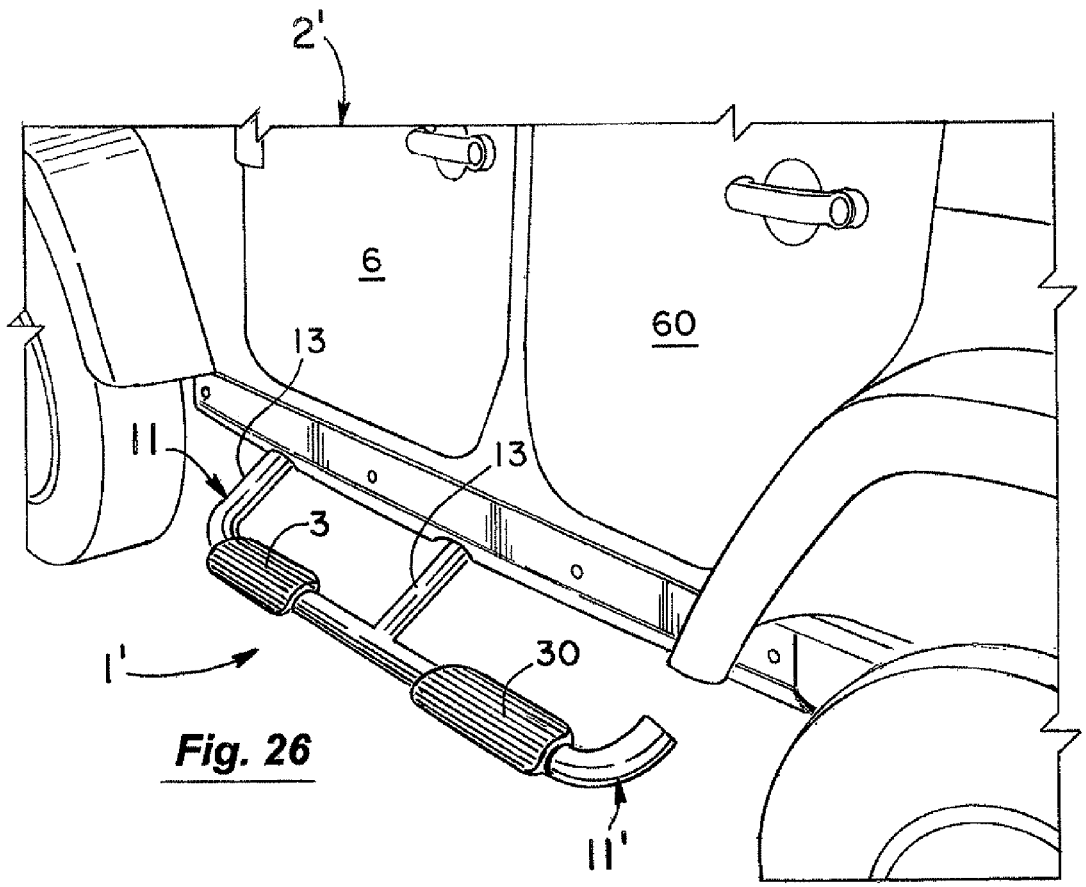
Figure 27:
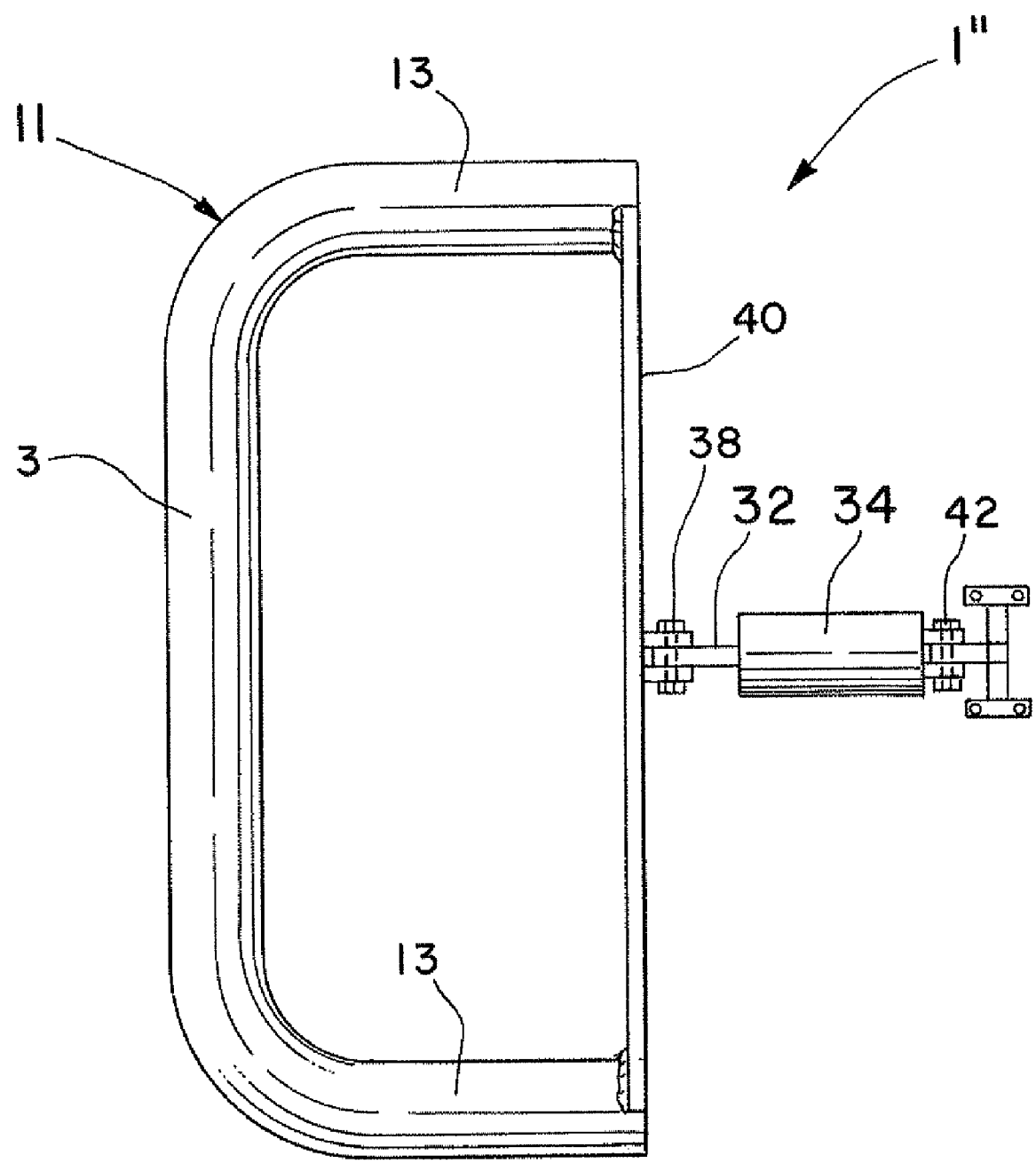
FIG. 27-30 illustrate a powered version of the adjustable step arrangement of the present invention.

The adjustable step arrangements of the present invention can also be adapted to four door vehicles such as 2' in FIGS. 25-26. The forward portion of the adjustable step arrangement 1' of FIGS. 25-26 under the front door 6 is the same as that of the arrangement 1 of FIGS. 1-24. For the rear door 60, the extension 11' with the extension step section 30 is added to extend rearwardly substantially below the rear door 60. The extension step section 30 is preferably rigidly attached to the tube member 11 and is movable therewith as illustrated. As with the adjustable arrangement 1 of FIGS. 1-24, the arrangement 1' of FIGS. 25-26 can be positioned on one or both sides of the vehicle.

Figure 28:
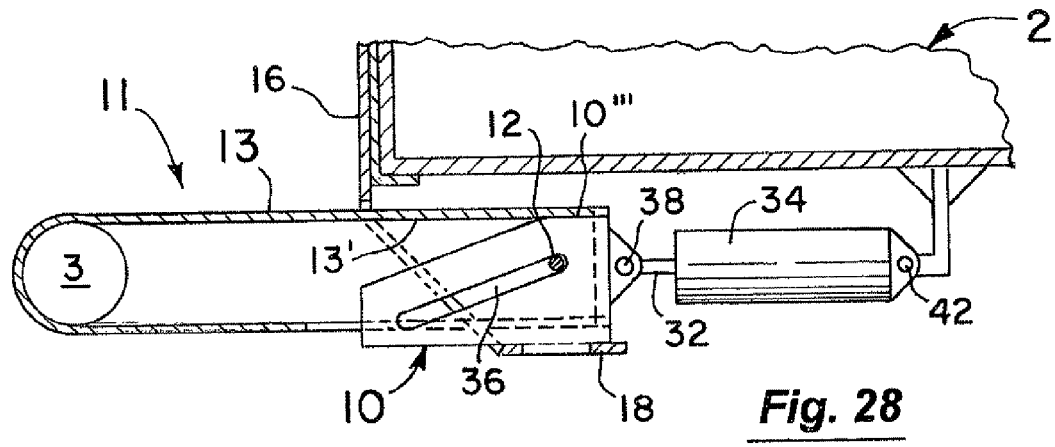
Figure 29:
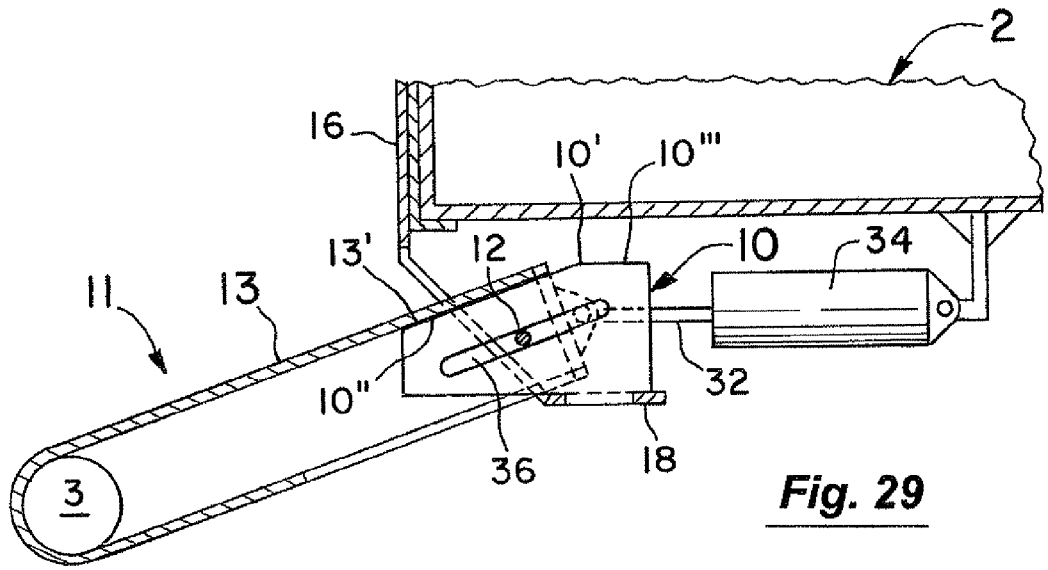
Figure 30:
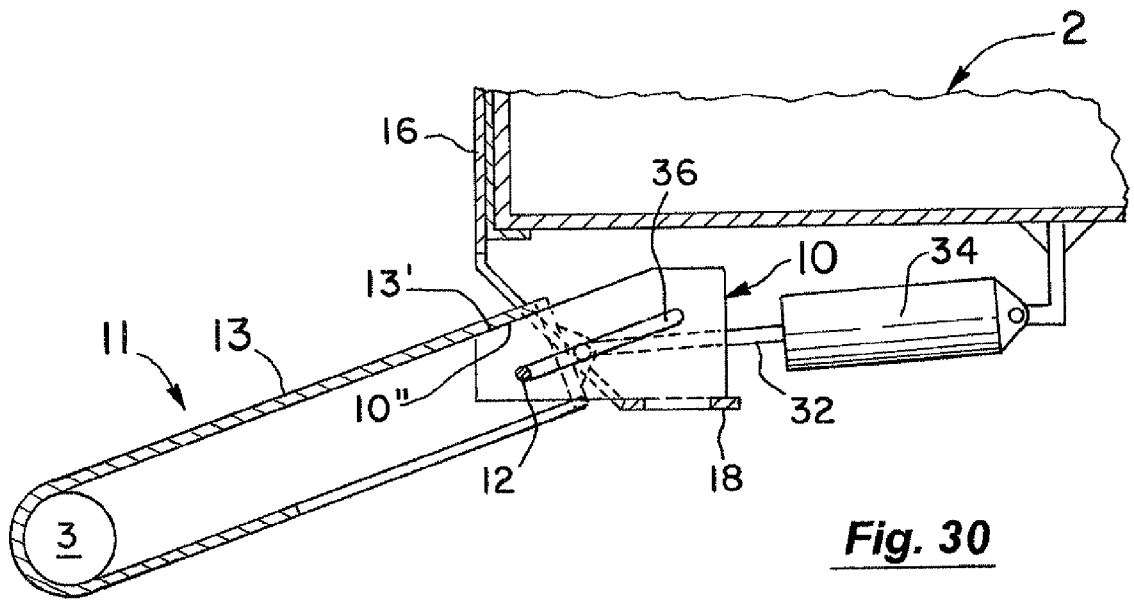

The adjustable step arrangements of the present invention can additionally be powered if desired as in the arrangement 1" of FIGS. 27-30. To accomplish this, a piston-cylinder assembly 32,34 for example can be provided as illustrated with the guide channel 22 of FIGS. 16-18 and 20-22 modified as in FIGS. 28-30 to be an inclined (e.g., 20-30 degrees) channel 36. The piston-cylinder assembly 32,34 is pivotally attached at 38 to the cross piece 40 and at 42 to the vehicle 2 (FIG. 28). The piston-cylinder 32,34 can then be moved between its retracted position of FIG. 28 and extended position of FIG. 30 to move the tube member 11 between its raised and lowered positions. As the tube member 11 is moved outwardly from the position of FIG. 28 to FIG. 29, its front will drop or substantially pivot about the edge 10' of guide plate 10 in a manner similar to FIGS. 17 and 21. However, the inner surface 13' of each hollow leg portion 13 will thereafter be slid under the power of the piston-cylinder 32,34 down the inclined (e.g., 20-30 degrees) surface 10" as in FIGS. 29-30. The movement of the tube member 11 to its lowered position from FIG. 29 is then along an inclined path. The powered piston-cylinder 32,34 in cooperation with the inclined surface 10" and bolt 12 preferably binds the tube member 11 in its lowered position (FIG. 30). Similarly, the piston-cylinder 32,34 will do so in the raised position (FIG. 28) with the inner surface 13' of the leg portion 13 atop the horizontal surface 10''' of the guide plate 10 and the leg portion 13 supported on the horizontal plate 18. Because the embodiment of FIGS. 27-30 is powered, the piston-cylinder 32,34 assembly can be incrementally operated to position the tube member 11 and its step section 3 anywhere between the raised and lowered positions of FIGS. 28 and 30.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

We claim:

1. An adjustable step arrangement for a vehicle having at least one door, said step arrangement including:

a substantially U-shaped tube member with substantially parallel, hollow leg portions spaced from each other and respectively extending along a first axis (17) and a hollow step section extending between the leg portions and along a second axis (19) substantially perpendicular to the first axis, said leg portions having respective slots extending substantially parallel to each other along the first axis and being spaced a first distance from each other, and a guide system mounted to the vehicle below said door, said guide system including at least two, substantially vertical guide plate members (10) spaced from each other substantially said first distance said slots are spaced from each other and extending substantially parallel to each other along a third axis, said third axis being substantially horizontal and said plate members and said third axis (24) being fixed relative to said vehicle, said plate members being respectively slidably receivable in the slots of said leg portions to extend within said respective hollow leg portions wherein said U-shaped tube member can be moved relative to said plate members and said vehicle along said third axis between at least first and second positions, said U-shaped tube member in said first position extending substantially horizontally with the first (17) and third (24) axes substantially aligned and with the step section of the U-shaped tube member substantially below the door of the vehicle and spaced outwardly of the vehicle, said U-shaped tube member in said second position extending at an inclined angle to the horizontal with the first axis (17) inclined to the third axis (24) and with the step section of the U-shaped tube member spaced lower and farther out from the vehicle than in said first position.

2. The step arrangement of claim 1 wherein at least one of said plate members has a channel extending therealong and at least one of said leg portions has an elongated member (12) attached thereto and extending substantially along said second axis (19) substantially perpendicular to the first axis (17) through the channel wherein the elongated member slides within and along said channel as said U-shaped tube member is moved between said first and second positions.

3. The step arrangement of claim 2 wherein said channel has a main section extending substantially horizontally and a notch section extending substantially vertically upwardly therefrom, said elongated member being received in the main section of the channel with the tube member in said first position and received in the notch section with the tube member in said second position.

4. The step arrangement of claim 3 further including a substantially linear, elastic cord member with first and second ends, said linear cord member extending within said U-shaped tube member including the leg portions and step section thereof with the ends thereof respectively attached to the guide system to bias the U-shaped tube member toward said first position.

5. The step arrangement of claim 4 wherein at least one of the ends of said linear cord member is attached to one of said plate members.

6. The step arrangement of claim 4 wherein said linear cord member is an elastic cord.

7. The step arrangement of claim 4 wherein said linear cord member biases said elongated member (12) into said notch section with said U-shaped tube member in said second position.

8. The step arrangement of claim 2 wherein said guide system further includes at least one substantially horizontal plate member (18) supporting at least one of the leg portions of said U-shaped tube member in said horizontal first position with said elongated member (12) received in the main section of the channel in the one plate member.

9. The step arrangement of claim 8 wherein said horizontal plate member supports both leg portions of the U-shaped tube member in said horizontal first position.

10. The step arrangement of claim 2 wherein said plate member has an edge (10') extending substantially perpendicular to the first axis (17) and said tube member substantially pivots about said edge to said second position to move the step section of the tube member downwardly.

11. The step arrangement of claim 10 wherein the channel in the plate member has a main section extending substantially horizontally and a notch section extending substantially vertically upwardly therefrom, said elongated member (12) being received in the main section of the channel with the tube member in said first position and received in the notch section with the tube member in said second position.

12. The step arrangement of claim 2 wherein said channel in the plate member is inclined to the horizontal.

13. The step arrangement of claim 12 further including a powered piston-cylinder assembly to move said U-shaped tube member between said first and second positions.

14. The step arrangement of claim 13 wherein said plate member has an edge (10') extending substantially perpendicular to the first axis (17) and a surface (10") inclined downwardly from said edge at an angle substantially the same as the inclined channel wherein said piston-cylinder assembly moves said tube member outwardly from said first position to substantially pivot about said edge and thereafter moves the tube member to slide downwardly along the inclined surface (10") to said second position.

15. The step arrangement of claim 13 wherein said guide system includes a horizontal plate member (18) supporting at least one of said leg portions of the U-shaped tube member in said horizontal first position.

16. The step arrangement of claim 13 wherein said plate member has an edge (10') extending substantially perpendicular to the first axis (17) and a surface (10") inclined downwardly from said edge at an angle substantially the same as the inclined channel wherein said piston-cylinder assembly moves said tube member outwardly from said first position to substantially pivot about said edge and thereafter slide downwardly along inclined surface to said second position to move the step section of the tube member downwardly.

17. The step arrangement of claim 1 further including an angled step piece (3') mounted to the step section of said U-shaped tube member, said angled step piece having first and second substantially flat surfaces (33,35) joined at an angle wherein the first flat surface is substantially horizontal when the U-shaped tube piece is in said first position and the second flat surface is substantially horizontal when the U-shaped tube piece is in said second position.

18. The step arrangement of claim 1 wherein said vehicle has at least a second door rearward of the first door and said U-shaped tube member has an extension step section extending rearwardly of said first-mentioned step section substantially below said second door, said extension step section being rigidly attached to the U-shaped tube member and being movable therewith.

19. A biased, adjustable step arrangement for a vehicle having at least one door, said step arrangement including:
a step member,
a guide system mounted below said door to support said step member for selective movement relative to said vehicle between at least first and second positions, said step member in said first position being spaced outwardly of said vehicle below said door to assist a user getting into and out of the vehicle with the step member remaining in said first position as the user steps thereon getting into and out of the vehicle, said step member being movable to said second position with said step member in said second position being spaced lower and laterally farther out from the vehicle than in said first position, and
an elastic cord to bias said step member toward said first position.

20. The step arrangement of claim 19 wherein said step member is hollow and said elastic cord extends within said hollow step member.

21. The step arrangement of claim 20 wherein said elastic cord has two ends with at least one of said ends attached to said guide system.

22. The step arrangement of claim 19 wherein said elastic cord provides a force to bias said step member toward said first position and said step arrangement further includes a mechanism to maintain the step member in said second position against the biasing force of said elastic cord.

23. The step arrangement of claim 19 wherein said elastic cord is padded.

24. A spring-biased, adjustable step arrangement for a vehicle having at least one door, said step arrangement including:
a step member,
a guide system mounted below said door to support said step member for selective movement relative to said vehicle between at least first and second positions, said step member in said first position being laterally spaced outwardly of said vehicle below said door to assist a user getting into and out of the vehicle with the step member remaining in said first position as the user steps thereon getting into and out of the vehicle, said step member being movable to said second position with said step member in said second position being spaced lower and laterally farther outwardly from the vehicle than in said first position to assist the user getting into and out of the vehicle with the step member remaining in said second position as the user steps thereon getting into and out of the vehicle, and
a spring member to bias said step member toward said first position.

25. The step arrangement of claim 24 wherein said step member is hollow and said spring member extends within said hollow step member.

26. The step arrangement of claim 25 wherein said spring member is substantially linear and has two ends with at least one of said ends attached to said guide system.

27. The step arrangement of claim 26 wherein said spring member is an elastic cord.

28. The step arrangement of claim 27 wherein said elastic cord is padded.

29. The step arrangement of claim 24 wherein said spring member provides a force to bias said step member toward said first position and said step arrangement further includes a mechanism to maintain the step member in said second position against the biasing force of said spring member.

* * * * *